(12) United States Patent
Roy et al.

(10) Patent No.: US 12,001,273 B2
(45) Date of Patent: Jun. 4, 2024

(54) SOFTWARE VALIDATION FRAMEWORK

(71) Applicant: Dell Products L.P., Round Rock, TX (US)

(72) Inventors: Baishali Roy, Bangalore (IN); Antarlina Tripathy, Bangalore (IN); Panguluru Vijaya Sekhar, Bangalore (IN); Shivangi Geetanjali, Patna (IN); Sowmya Kumar, Bangalore (IN); Sambasivarao Gaddam, South Grafton, MA (US); Shivangi Maharana, Cuttack (IN); Sashibhusan Panda, Bengaluru (IN); Shishir Kumar Parhi, Bangalore (IN); Harikrishna Reyyi, Patha Agraharam (IN); Seshadri Srinivasan, Shrewsbury, MA (US); Bijan Kumar Mohanty, Austin, TX (US); Hung Dinh, Austin, TX (US); Sweta Kumari, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 479 days.

(21) Appl. No.: 17/225,229

(22) Filed: Apr. 8, 2021

(65) Prior Publication Data

US 2022/0327012 A1 Oct. 13, 2022

(51) Int. Cl.
*G06F 11/07* (2006.01)
*G06F 18/24* (2023.01)
*G06N 20/00* (2019.01)

(52) U.S. Cl.
CPC ........ *G06F 11/079* (2013.01); *G06F 11/0769* (2013.01); *G06F 18/24* (2023.01); *G06N 20/00* (2019.01)

(58) Field of Classification Search
None
See application file for complete search history.

(56) References Cited

U.S. PATENT DOCUMENTS

| 2020/0117580 A1* | 4/2020 | Lekivetz | G06F 11/368 |
| 2021/0132927 A1* | 5/2021 | Dinh | G06Q 10/103 |
| 2021/0132935 A1* | 5/2021 | Dinh | G06F 9/4411 |

(Continued)

FOREIGN PATENT DOCUMENTS

WO  WO-0175593 A2 * 10/2001 ......... G06F 16/2365

OTHER PUBLICATIONS

Software Testing Tools Guide, QAS, www.testingtoolsguide.net/tools/qas/, Accessed Mar. 25, 2021, 3 pages.

(Continued)

*Primary Examiner* — Qing Chen
(74) *Attorney, Agent, or Firm* — Ryan, Mason & Lewis, LLP

(57) ABSTRACT

A method comprises receiving a request for validation of software comprising one or more applications, analyzing the request and generating one or more validation steps based at least in part on the analysis. In the method, a time to complete the one or more validation steps is predicted. The predicting is performed using one or more machine learning models, and is based at least in part on a type and a number of the one or more applications.

20 Claims, 19 Drawing Sheets

(56) References Cited

U.S. PATENT DOCUMENTS

2022/0066852 A1* 3/2022 Ramanujan ......... G06F 11/0709

OTHER PUBLICATIONS

Oracle, "Development, Test, QA, and Production Environments," https://docs.oracle.com/cd/E19225-01/821-0763/ahxbb/index.html, Accessed Mar. 25, 2021, 1 page.
VWO, "What is the Difference between Dynamic and Static Content," https://help.vwo.com/hc/en-us/articles/360020735334-What-is-the-difference-between-Dynamic-and-Static-Content, Accessed Mar. 23, 2021, 5 pages.
Wikipedia, "Content Delivery Network," https://en.wikipedia.org/w/index.php?title=Content_delivery_network&oldid=1013599966, Mar. 22, 2021, 13 pages.

* cited by examiner

| RELEASE | COMP. NO. | P2P | BATCH | COLLECT./ DIST. | WEB SERVICE | BATCH PROP. | GIT PROP. MIGR. | CHAN. POLL. | PCF SERV. MIGR. | TABLE CREATION | LAYER 7 | CONTROL M JOB MIGR. | PCF APP MIGR. | JAR MIGR. | MQ MIGR. | TIME |
|---|---|---|---|---|---|---|---|---|---|---|---|---|---|---|---|---|
| 1 | 4 | 1 | 1 | 2 | 0 | 1 | 1 | 1 | 0 | 0 | 0 | 0 | 2 | 1 | 1 | 5 |
| 2 | 5 | 3 | 1 | 1 | 0 | 1 | 3 | 2 | 0 | 2 | 0 | 1 | 3 | 1 | 0 | 7 |
| 3 | 7 | 6 | 1 | 0 | 0 | 1 | 4 | 2 | 0 | 0 | 2 | 0 | 6 | 1 | 2 | 6 |
| 4 | 2 | 1 | 0 | 1 | 0 | 0 | 1 | 1 | 0 | 3 | 1 | 1 | 2 | 1 | 1 | 3 |
| 5 | 1 | 0 | 0 | 1 | 0 | 0 | 1 | 0 | 0 | 0 | 0 | 1 | 1 | 0 | 0 | 2 |
| 6 | 4 | 0 | 4 | 0 | 0 | 4 | 0 | 1 | 0 | 0 | 0 | 4 | 0 | 2 | 0 | 5 |
| 7 | 4 | 2 | 0 | 2 | 0 | 0 | 2 | 0 | 0 | 5 | 0 | 0 | 4 | 0 | 0 | 5 |
| 8 | 3 | 1 | 0 | 0 | 2 | 1 | 1 | 1 | 1 | 0 | 0 | 0 | 3 | 0 | 0 | 5 |
| 9 | 2 | 1 | 1 | 0 | 0 | 1 | 1 | 0 | 0 | 2 | 0 | 0 | 0 | 1 | 0 | 3 |
| 10 | 3 | 2 | 1 | 0 | 0 | 1 | 2 | 1 | 0 | 0 | 0 | 0 | 1 | 1 | 1 | 4 |

FIG. 10

```
rf_model = RandomForestRegressor(n_estimators = 2, random_state = 42)
rf_model.fit(train_features, train_labels);
```

```
# Use the forest's predict method on the test data
predictions = rf_model.predict(test_features)
# Calculate the absolute errors
errors = abs(predictions - test_labels)
# Print out the mean absolute error (mae)
print('Mean Absolute Error:', round(np.mean(errors), 2))
```

Mean Absolute Error: 1.49

```
# Calculate mean absolute percentage error (MAPE)
mape = 100 * (errors / test_labels)
# Calculate and display accuracy
accuracy = 100 - np.mean(mape)
print('Accuracy:', round(accuracy, 2), '%.')
```

Accuracy: 98.35%

```
In [37]: import seaborn as sns
         import matplotlib.pyplot as plt

In [77]: fig, ax = plt.subplots(figsize=(40,40))
         unique_label = np.unique([predictions, y_test])
         mat = confusion_matrix(predictions, y_test)
         sns.set(font_scale=5.0)
         sns.heatmap(mat,square=True, annot=True, fmt='d', cbar=False, ax=ax,xticklabels=unique_label, yticklabels=unique_label)
         plt.xlabel('true label')
         plt.ylabel('predicted label')
```

| | AUTOSCALE | BUILDPACK | COMMON GIT PROPERTY | DB TIMEOUT | GEMFIRE | GEMFIRE DISKSPACE | GIT PROPERTY | INTEGRATION CHANNEL ISSUE | KAFKA CONNECT | MOUNT | PCF SERVICE | PCF SPACE | RMQ HOST | RMQ QUEUE | WEB SERVICE |
|---|---|---|---|---|---|---|---|---|---|---|---|---|---|---|---|
| AUTOSCALE | 5 | 0 | 0 | 0 | 0 | 0 | 0 | 0 | 0 | 0 | 0 | 0 | 0 | 0 | 0 |
| BUILDPACK | 0 | 1 | 0 | 0 | 0 | 0 | 0 | 0 | 0 | 0 | 0 | 0 | 0 | 0 | 0 |
| COMMON GIT PROPERTY | 0 | 0 | 3 | 0 | 0 | 0 | 0 | 0 | 0 | 0 | 0 | 0 | 0 | 0 | 0 |
| DB TIMEOUT | 0 | 0 | 0 | 1 | 0 | 0 | 0 | 0 | 0 | 0 | 0 | 0 | 0 | 0 | 0 |
| GEMFIRE | 0 | 0 | 0 | 0 | 6 | 0 | 0 | 0 | 0 | 0 | 0 | 0 | 0 | 0 | 0 |
| GEMFIRE DISKSPACE | 0 | 0 | 0 | 0 | 0 | 1 | 0 | 0 | 0 | 0 | 0 | 0 | 0 | 0 | 0 |
| GIT PROPERTY | 0 | 0 | 0 | 0 | 0 | 0 | 2 | 0 | 0 | 0 | 0 | 0 | 0 | 0 | 0 |
| INTEGRATION CHANNEL ISSUE | 0 | 0 | 0 | 0 | 0 | 0 | 0 | 2 | 0 | 0 | 0 | 0 | 0 | 0 | 0 |
| KAFKA CONNECT | 0 | 0 | 0 | 0 | 0 | 0 | 0 | 0 | 2 | 0 | 0 | 0 | 0 | 0 | 0 |
| MOUNT | 0 | 0 | 0 | 0 | 0 | 0 | 0 | 0 | 0 | 2 | 0 | 0 | 0 | 0 | 0 |
| PCF SERVICE | 0 | 0 | 0 | 0 | 0 | 0 | 0 | 0 | 0 | 0 | 6 | 0 | 0 | 0 | 0 |
| PCF SPACE | 0 | 0 | 0 | 0 | 0 | 0 | 0 | 0 | 0 | 0 | 0 | 2 | 0 | 0 | 0 |
| RMQ HOST | 0 | 0 | 0 | 0 | 0 | 0 | 0 | 0 | 0 | 0 | 0 | 0 | 1 | 0 | 0 |
| RMQ QUEUE | 0 | 0 | 0 | 0 | 0 | 0 | 0 | 0 | 0 | 0 | 0 | 0 | 0 | 5 | 0 |
| WEB SERVICE | 0 | 0 | 0 | 0 | 0 | 0 | 0 | 0 | 0 | 0 | 0 | 0 | 0 | 0 | 0 |

PREDICTED LABEL / TRUE LABEL

1500

SOFTWARE VALIDATION FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for software analysis and testing.

BACKGROUND

Software diagnosis refers to concepts, techniques and tools that permit evaluation of applications post deployment. Software diagnosis includes analysis and visualization of information sources of a software system and works as an early risk detection instrument. Software diagnosis can include validation of software configurations and testing of software as per user requirements.

With current approaches, there are challenges to develop appropriate and efficient techniques for proper diagnosis of software applications after deployment.

SUMMARY

Embodiments provide a software validation framework in an information processing system.

For example, in one embodiment, a method comprises receiving a request for validation of software comprising one or more applications, analyzing the request and generating one or more validation steps based at least in part on the analysis. In the method, a time to complete the one or more validation steps is predicted. The predicting is performed using one or more machine learning models, and is based at least in part on a type and a number of the one or more applications.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 10 depicts a table including a sample dataset for a software validation time prediction component in an illustrative embodiment.

FIG. 11 depicts example pseudocode for computing error and accuracy of a trained model for software validation time prediction in an illustrative embodiment.

FIG. 14 depicts example pseudocode for root cause prediction and depicting model accuracy in an illustrative embodiment.

FIG. 15 depicts a heatmap illustrating root cause prediction accuracy in an illustrative embodiment.

DETAILED DESCRIPTION

Figure 1:
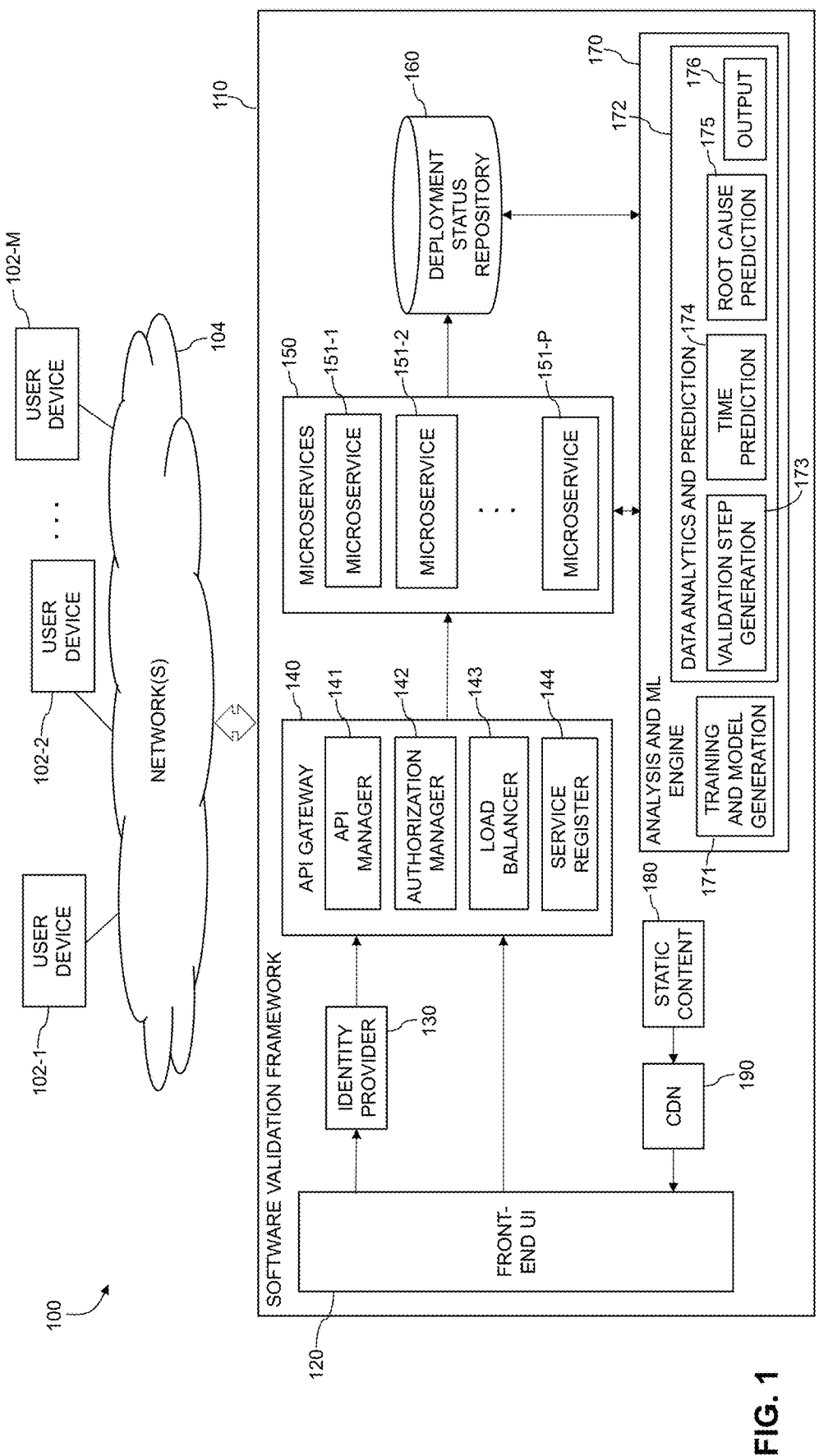
FIG. 1 depicts an information processing system with a software validation framework in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a software validation framework 110.

The user devices 102 can comprise, for example, Internet of Things (IoT) devices, desktop, laptop or tablet computers, mobile telephones, or other types of processing devices capable of communicating with the software validation framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and P are assumed to be arbitrary positive integers greater than or equal to two.

The terms "client" or "user" herein are intended to be broadly construed so as to encompass numerous arrangements of human, hardware, software or firmware entities, as well as combinations of such entities. Software validation services may be provided for users utilizing one or more machine learning models, although it is to be appreciated that other types of infrastructure arrangements could be used. At least a portion of the available services and functionalities provided by the software validation framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the software validation framework 110, as well as to support communication between the software validation framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the software validation framework 110.

The software validation framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Software analysis and testing (also referred to herein as "SWAT") is a process of validating software and its configurations post deployment. The software validation framework 110, on behalf of respective infrastructure tenants each corresponding to one or more users associated with respective ones of the user devices 102 provides a platform for using machine learning to manage post deployment activities in real-time. Advantageously, one or more embodiments provide: (i) creation of validation steps in connection with SWAT in real-time based on release migration instructions; (ii) prediction of SWAT timing required to validate a software release; (iii) software validation without manual intervention; (iv) predictive root cause analysis if any application crashes during SWAT; and (v) a reduction of the time to complete a release activity process.

Referring to FIG. 1, the software validation framework 110 includes a front-end user interface (UI) component 120, an identity provider 130, an API gateway 140, a microservices component 150, a deployment status repository 160 and an analysis and machine learning (ML) engine 170. In one or more embodiments, the software validation framework 110 also comprises a content delivery network (CDN) 190 through which static content 180 is sent to the front-end UI component 120.

The API gateway comprises an API manager 141, an authorization manager 142, a load balancer 143 and a service register 144. The microservices component 150 provides access to multiple types of microservices 151-1, 151-2, . . . 151-P (collectively "microservices 151"). The microservices 151 corresponding to the microservices component 150 include, for example, a cloud deployment service (e.g., Pivotal Cloud Foundry (PCF)), a message queuing service associated with one or more MOM providers (e.g., RabbitMQ (RMQ)), a change tracking service (e.g., GIT) and a workflow orchestration service (e.g., Control M). Although some example microservices are discussed herein, the embodiments are not necessarily limited to mentioned microservices, and the microservices component 150 can provide access to more or less, and different types of microservices.

The analysis and ML engine 170 includes a training and model generation component 171 and a data analytics and prediction component 172. The data analytics and prediction component 172 comprises a validation step generation component 173, a time prediction component 174, a root cause prediction component 175 and an output component 176.

Figure 2:
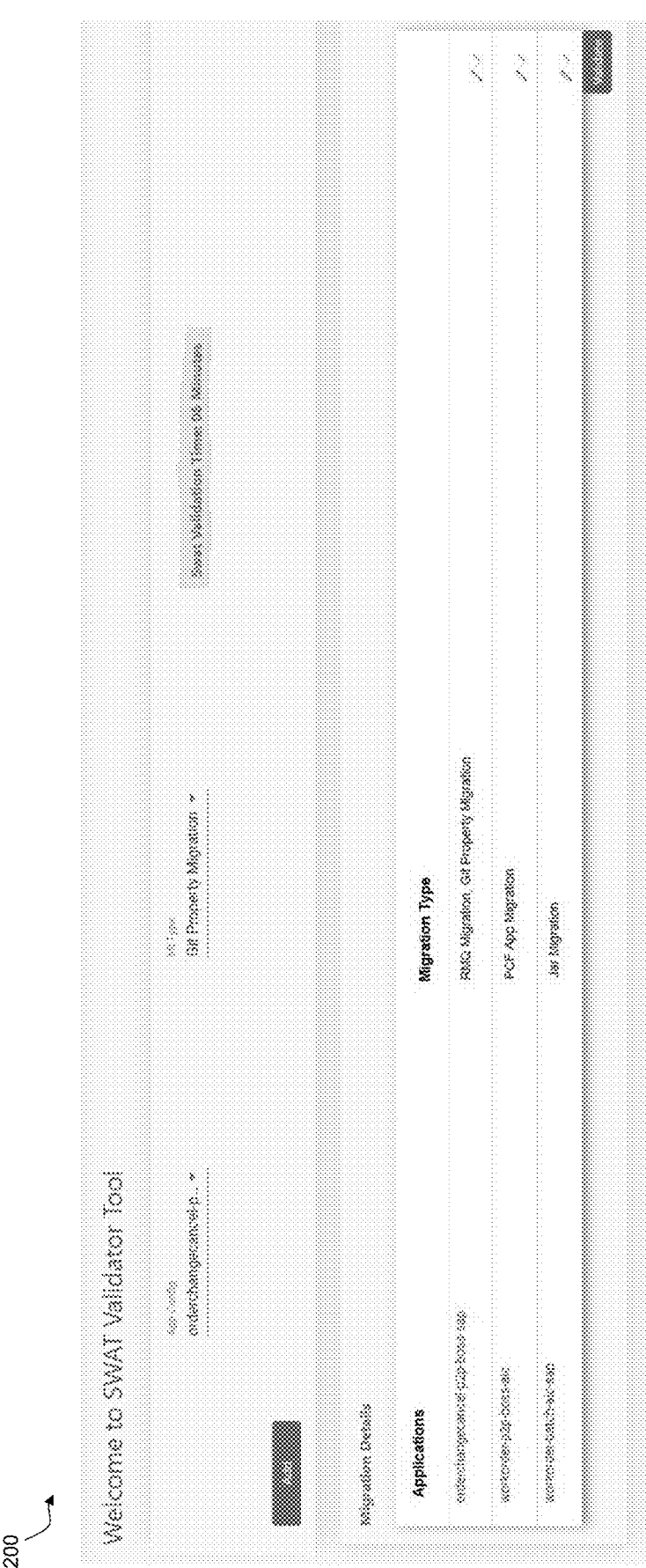
FIG. 2 depicts an example user interface corresponding to the creation of software validation steps and software validation time prediction in an illustrative embodiment.
Figure 3:
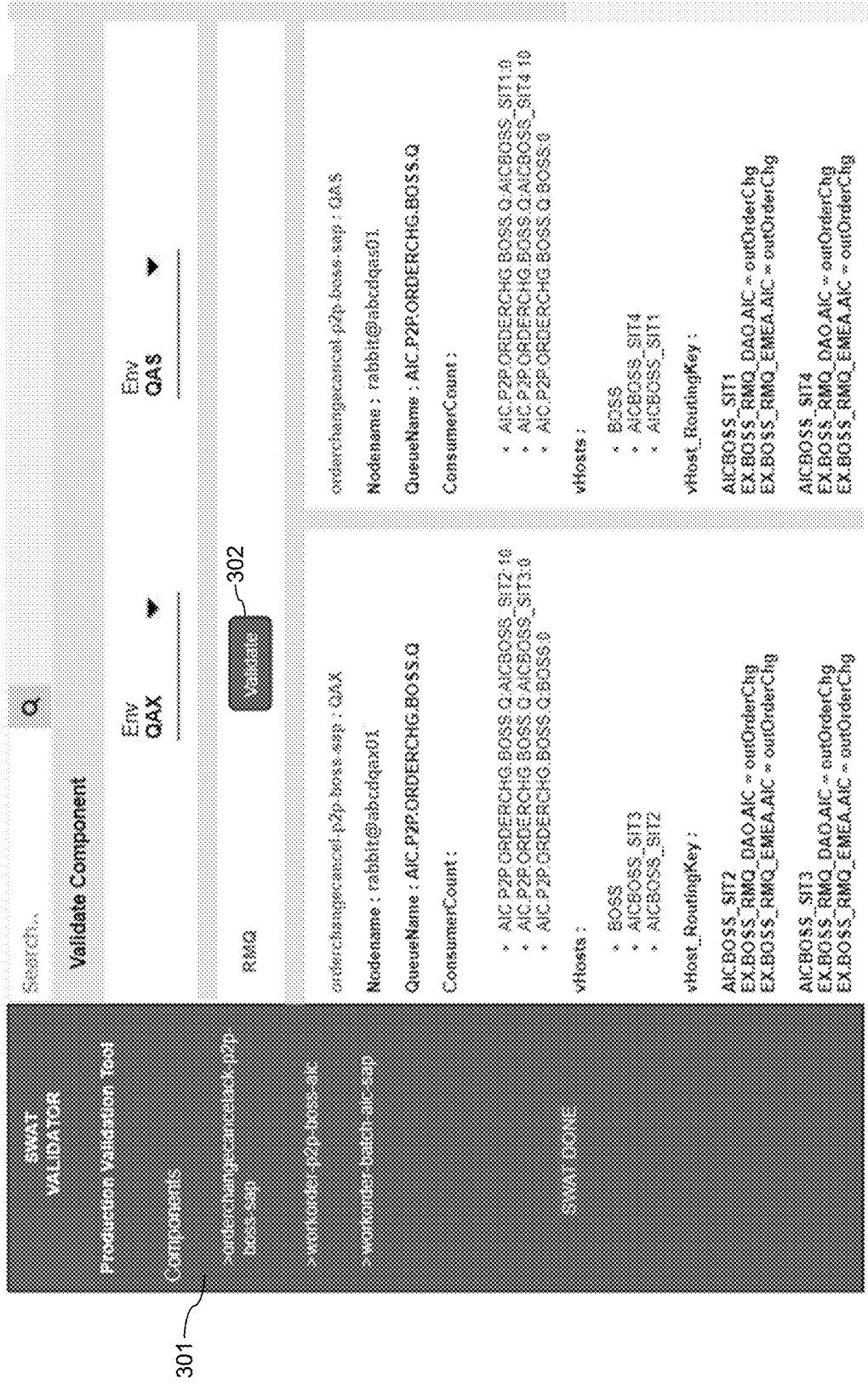
FIG. 3 depicts an example user interface corresponding to validation of message-oriented-middleware (MOM) details for an application in an illustrative embodiment.
Figure 4:
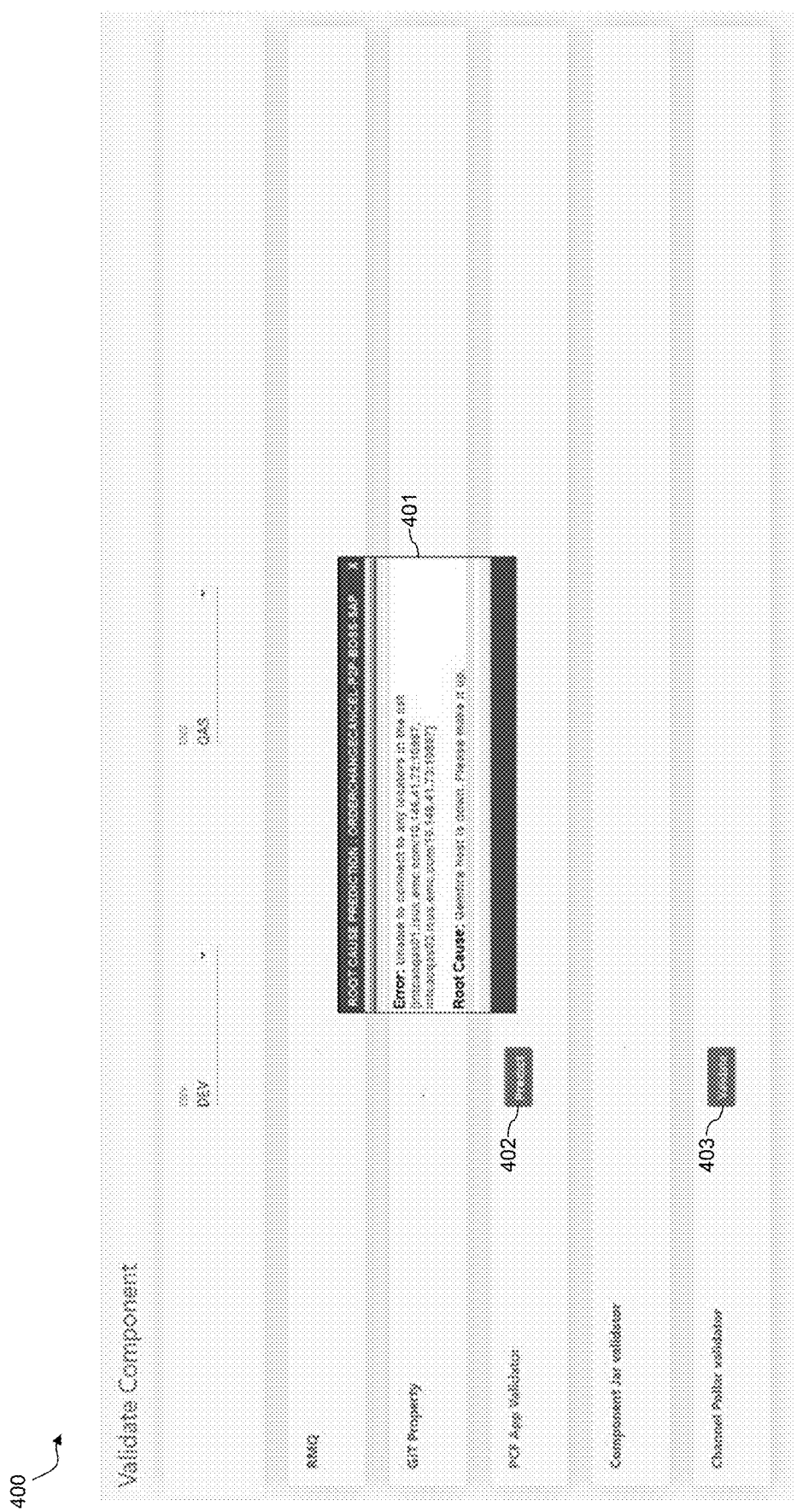
FIG. 4 depicts an example user interface corresponding to root cause analysis prediction for an application in an illustrative embodiment.

According to one or more embodiments, the front-end UI component 120 is hosted in a cloud platform server. The front-end UI component 120 routes software validation requests received from the user devices 102 to the API gateway 140 which, in turn, routes the requests to the appropriate microservices 151 of the microservices component 150. The microservices component 150 can process user requests received through user interfaces on user devices 102 by invoking multiple microservices from one or more back-end servers and compiling the results. User interfaces 200, 300 and 400, discussed in more detail in connection with FIGS. 2-4, are generated and managed by the front-end UI component 120. Like the front-end UI component 120, the API gateway 140 and the microservices component 150 may also be hosted in a cloud platform server.

The API gateway 140 and, more particularly, the API manager 141, calls APIs (e.g., representational state transfer (REST) APIs) corresponding to microservices 151 in the microservices component 150. When a software validation request is received from a user, an authorization manager 142 of the API gateway 142 authenticates the user based at least in part on the identity of the user provided by the identity provider 130, and calls corresponding validation microservices 151 to handle the request. User information can be provided to the API gateway via an identity provider 130. A load balancer 143 organizes tasks between different microservice providers based on, for example, their availability and volume of work and the types of services needed. A service register 144 maintains a registry of microservice providers that may be called upon to provide needed microservices in order to perform software analysis and testing to validate software.

The microservices component 150 is configured as a microservice-based software architecture comprising multiple different fine-grained services with lightweight protocols, whereby microservices 151 corresponding to different features of an application may be independently developed, deployed and scaled. The microservices 151 include loosely coupled and parallelized services. Each microservice comprises a separate codebase which can be managed easily. The microservice architecture enables the rapid, frequent and reliable delivery of large, complex applications, and facilitates evolution of a technology stack of an enterprise. According to an embodiment, the microservices are deployed independently in cloud foundry servers. As part of the validation request, the microservices component 150 receives software release details and release migration instructions in connection with deployment, analysis and testing of software. The validation request including the release details and migration instructions are provided to the microservices component 150 via the API gateway 140.

The deployment status repository 160 stores the outcomes of software deployments, including the time taken for previous deployments and validations, as well as details of the successful or failed execution of each application of a deployment. The data from the deployment status repository 160 is provided to the analysis and ML engine 170, and used by the training and model generation component 171 to train machine learning models used in connection with predicting the time to complete validation steps in connection with a deployment and predicting the root cause failure of an application during a deployment. As explained further herein, the time prediction and root cause prediction components 174 and 175 employ machine learning models to predict validation time and root cause for failed applications.

According to one or more embodiments, the deployment status repository 160 can be configured according to a relational database management system (RDBMS) (e.g., PostgreSQL). The deployment status repository 160 in some embodiments is implemented using one or more storage systems or devices associated with the software validation framework 110. In some embodiments, one or more of the storage systems utilized to implement the deployment status repository 160 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

FIG. 2 depicts an example user interface 200 corresponding to the creation of validation steps and to validation time prediction in connection with SWAT operations. Software validation steps are created in real-time based on release migration instructions, which mitigates the chances of missing a validation step. The user interface 200 shows SWAT validation steps based on applications and migration types. For example, the validation steps listed according to application and migration type in FIG. 2 are: (i) "orderchange-cancel-p2p-boss-sap" and RMQ and Git property migration; (ii) "workorder-p2p-boss-aic" and PCF application migration; and (iii) "workorder-batch-aic-sap" and Java Archive (JAR) migration. The predicted time to complete validation is shown as 6 minutes in the user interface 200. As explained further herein, the validation steps are generated by the validation step generation component 173 and the predicted time is given by the time prediction component 174 of the data analytics and prediction component 172. According to the embodiments, the time taken to complete a SWAT process decreases with respect to conventional approaches due, at least in part, to the lack of manual intervention and to the use of machine learning model(s) to predict the time for software validation, which helps subject matter experts (SMEs) better plan for releases.

FIG. 3 depicts an example user interface 300 corresponding to validation of RMQ details for an application in an illustrative embodiment. The microservice architecture of the microservices component 150 provides independent SWAT processes for different migration types. The software validation framework 110 provides validation with a single click for a given step. In the user interface 300, validation of RMQ details for the application "orderchangecancel-p2p-boss-sap" are represented as being performed between a source environment (QAX) on the left side of FIG. 3 and a target environment (QAS) on the right side of FIG. 3. In a non-limiting embodiment, the source and target environments comprise QAX and QAS environments, respectively, which are software development and testing platforms used for quality management of software development projects. Additional information associated with each environment, such as, for example, node names, queue names, consumer counts, virtual hosts (vHosts) and vHost routing keys are provided on the user interface 300. Referring back to the user interface 200 in FIG. 2, which lists applications being validated, the interface 300 also lists on the left side under a "Components" heading 301, the applications that are being validated. The user interface 300 further includes a "Validate" activation button 302, which, when clicked on (using, for example, a mouse, stylus, finger or other activation mechanism) by a user enables validation of RMQ details for the application "orderchangecancel-p2p-boss-sap" to commence in the source and target environments.

FIG. 4 depicts an example user interface 400 corresponding to root cause analysis prediction for an application in an illustrative embodiment. The software validation framework 110 and, more particularly, the root cause prediction component 175 provides predictive root cause analysis for applications that fail during software validation. A machine learning model used by the root cause prediction component 175 and explained further herein, predicts root cause during SWAT activity in real-time. A decision tree classifier is used by the machine learning model to analyze application error logs and predict a possible root cause for the failure of the application. As a non-limiting illustrative example, the user interface 400 displays in a display box 401, the prediction of the root cause and the error for a crashed application on a cloud server. For example, in keeping with the operational example of the "orderchangecancel-p2p-boss-sap" application, the root cause prediction component 175 identifies an error, which in this case is an inability to connect to any locators in a given list, and the root cause of the error (e.g., why the application has crashed), which in this case is that a Gemfire host is down. The user interface 400 further includes a "Predict" activation button 402, which, when clicked on (using, for example, a mouse, stylus, finger or other activation mechanism) by a user enables root cause prediction for the failed application "orderchangecancel-p2p-boss-sap" to commence in connection with PCF application validation. Alternatively, root cause prediction can occur automatically following a failure. The user interface 400 further includes a "Validate" activation button 403, which, when clicked on (using, for example, a mouse, stylus, finger or other activation mechanism) by a user enables validation of channel poller details for the application "orderchangecancel-p2p-boss-sap" to commence in source and target environments, which in this case comprise development (DEV) and QAS environments. A DEV environment is where applications can be configured and customized for another environment. DEV environments are also utilized to write upgrade procedures to be followed in a target environment.

The time prediction component 174 of the data analytics and prediction component 172 of the analysis and ML engine 170 predicts the time to complete SWAT for a set of validation steps for a given release. The root cause prediction component 175 predicts the root cause for a failed application during SWAT. The output component 176, in conjunction with the front-end UI component 120, provides the data for and generates the interfaces 200, 300 and/or 400 including the predicted times and/or predicted root causes, which can be viewed on a user device 102.

Figure 5:
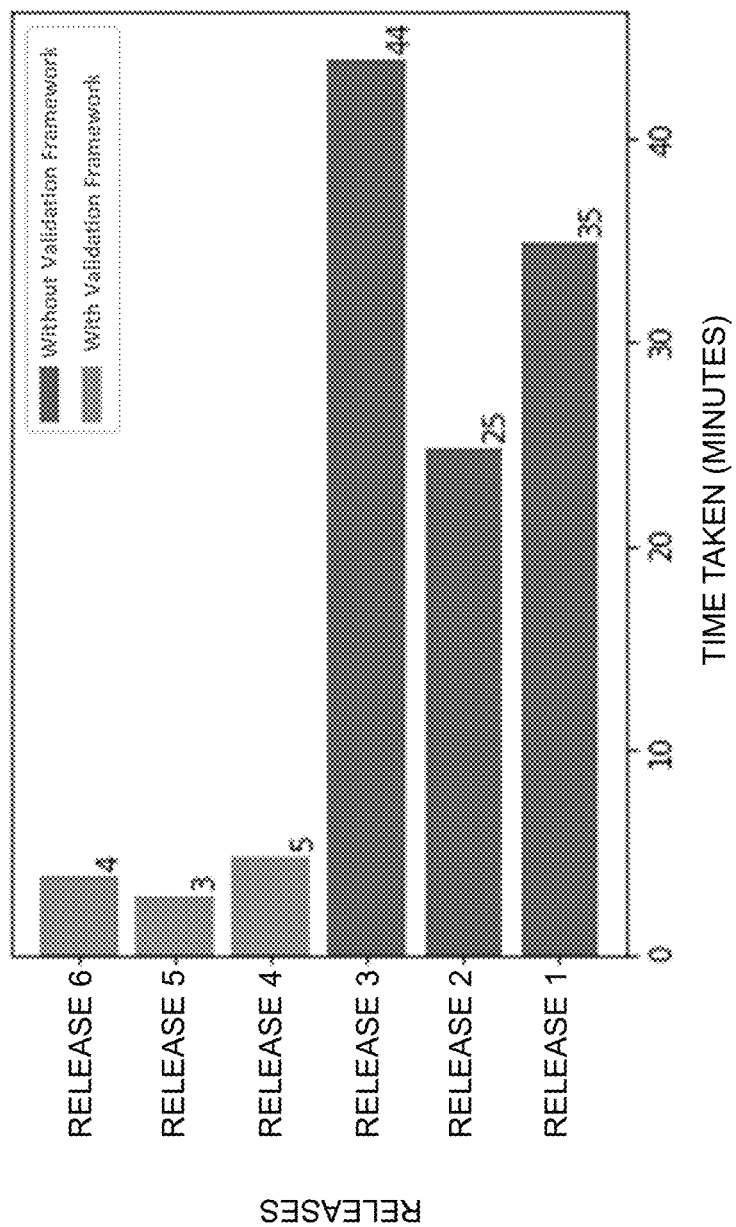
FIG. 5 depicts a graph of the time taken for validation for a component in multiple software releases in an illustrative embodiment.

Referring to FIG. 5, a graph 500 illustrates the differences between the time taken for validation of an application in multiple software releases when the software validation framework 110 has been used and not been used. As can be seen in FIG. 5, in connection with Releases 1, 2 and 3, the software validation framework 110 was not used and the validation times for Releases 1, 2, 3 were 35, 25 and 44 minutes, respectively. In connection with Releases 4, 5 and 6, the software validation framework 110 was used and the validation times for Releases 4, 5, 6 were 5, 3 and 4 minutes, respectively. The embodiments provide a software validation framework 110 that delivers a release process which minimizes SME manual intervention and manages post deployment activities in real-time. The embodiments decrease the time to complete a release process when compared with conventional techniques, by programmatically generating SWAT validation steps based on release migration instructions and validating SWAT steps without any manual intervention.

Figure 6:
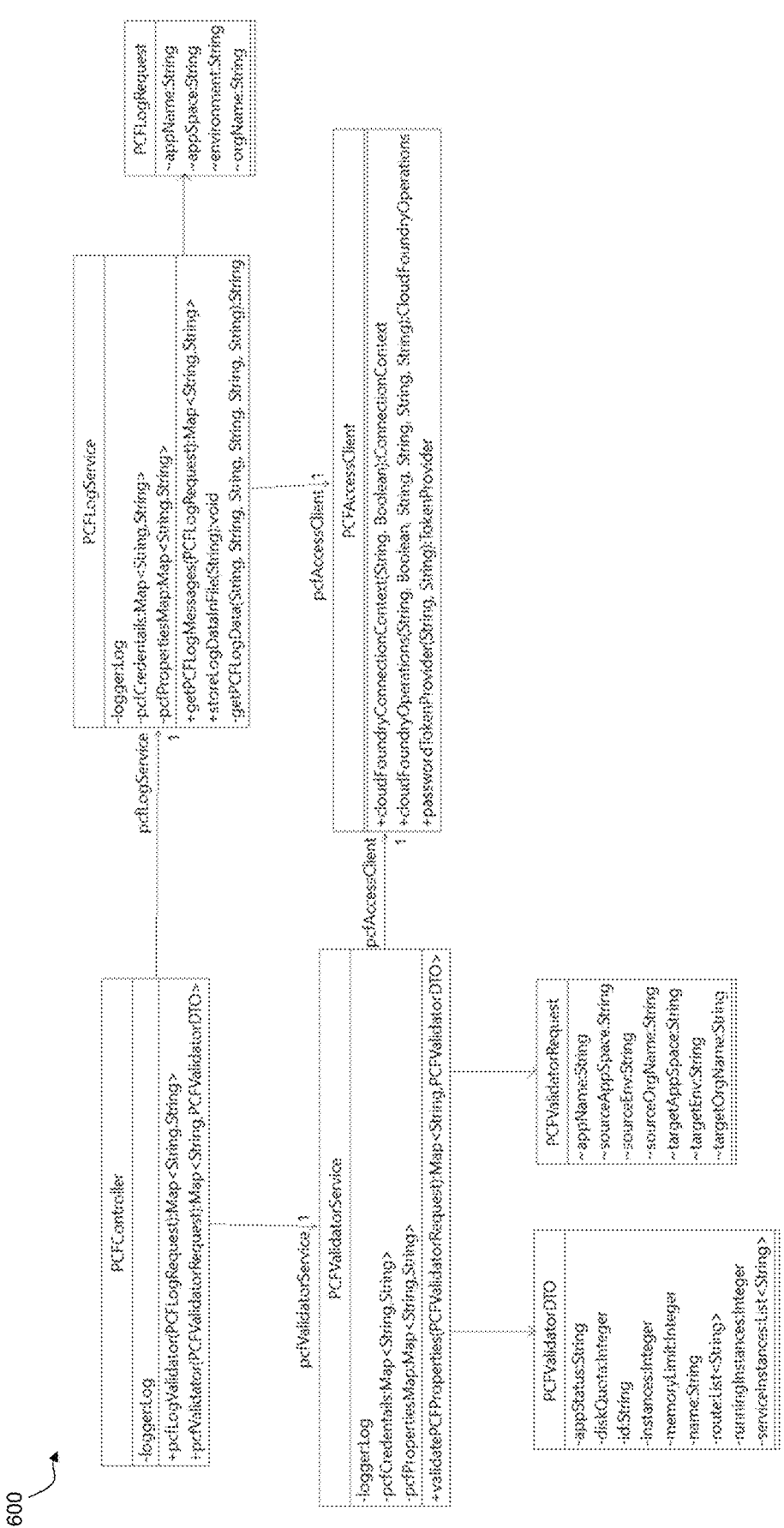
FIG. 6 depicts a class diagram for an application deployment microservices validator and a root cause predictor in an illustrative embodiment.
Figure 7:
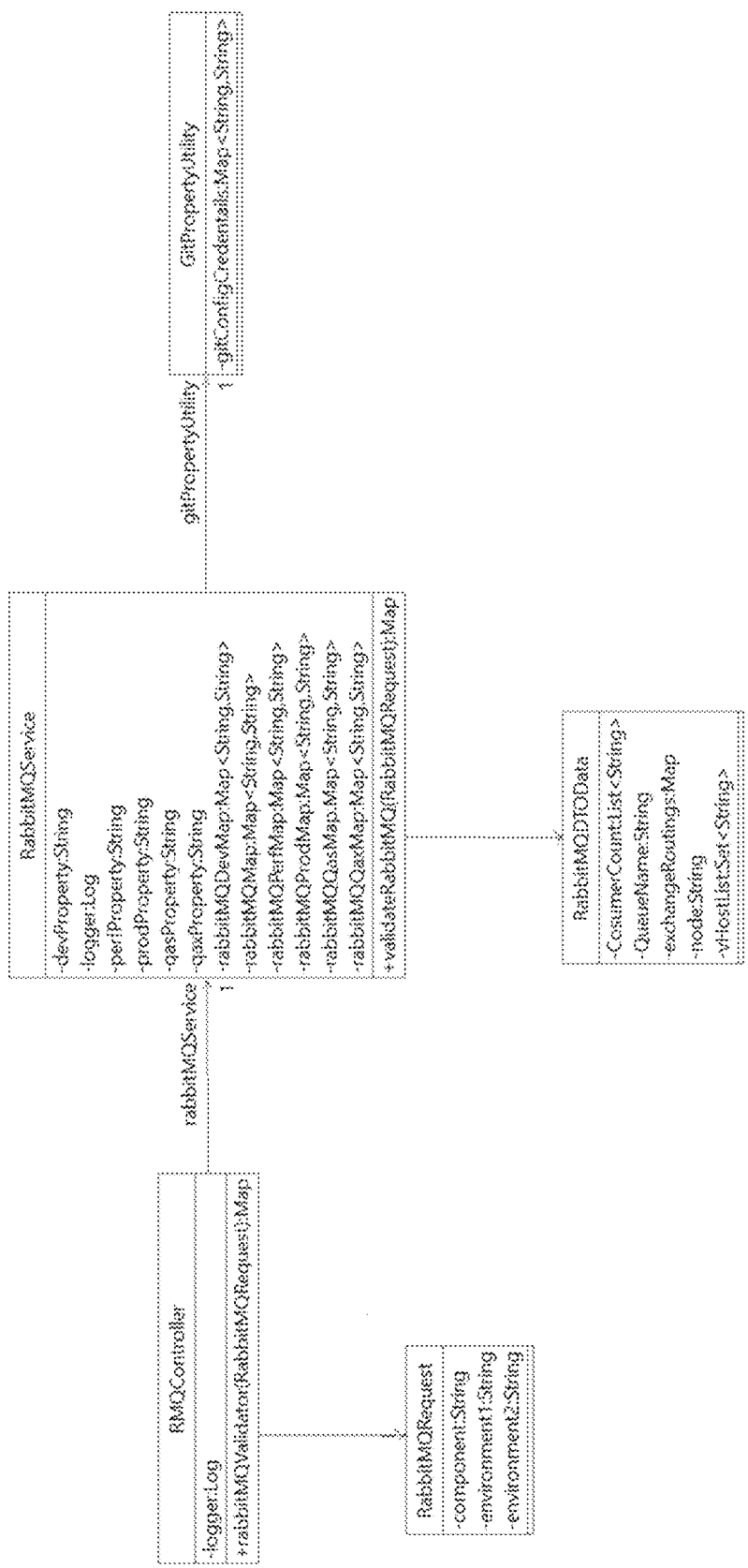
FIG. 7 depicts a class diagram for a MOM microservices validator in an illustrative embodiment.
Figure 8:
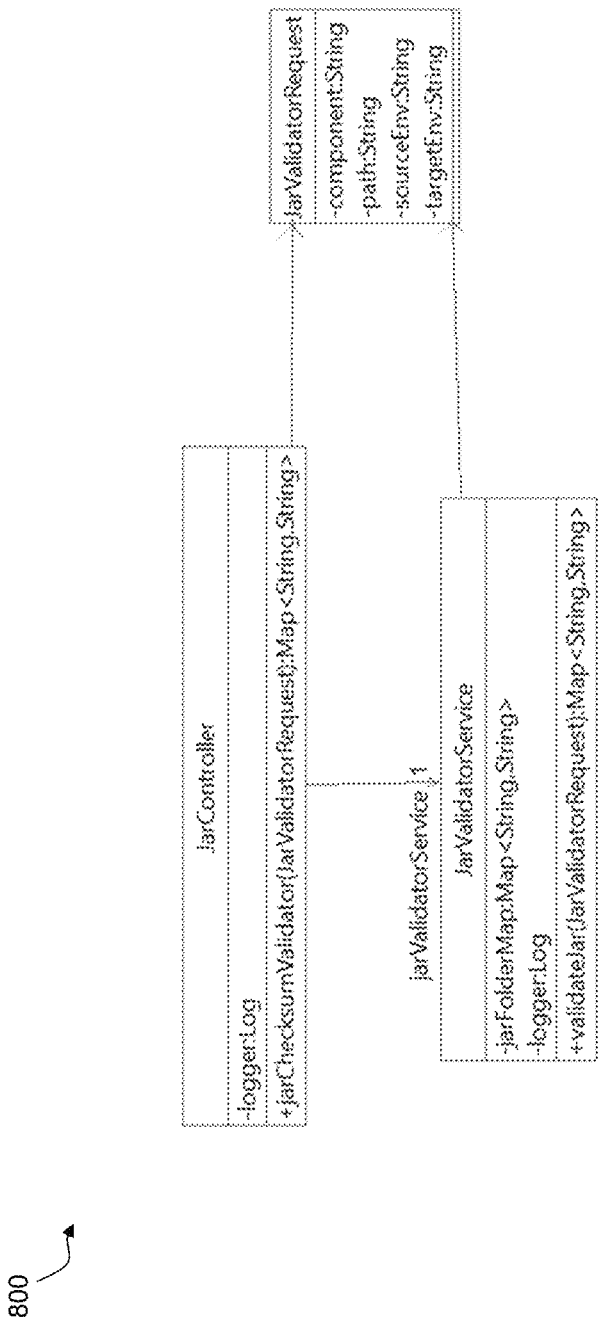
FIG. 8 depicts a class diagram for a JAVA archive (JAR) microservices validator in an illustrative embodiment.

FIGS. 6, 7 and 8 depict class diagrams 600, 700 and 800 for some example microservices 150 provided by the software validation framework 110. The class diagram 600 is for an application deployment microservices validator and a root cause predictor, the class diagram 700 is for a MOM microservices validator and the class diagram 800 is for a JAR microservices validator. A class diagram is an illustrative tool used to illustrate relationships among classes (e.g., Java® classes) that make up an application. Using Unified Modeling Language (UML), class diagrams typically include class names, class variables and class operations. For example, the UML representation of a class is illustratively shown as a rectangle containing top, middle and bottom sections vertically stacked. The top section includes the class name, the middle section includes the class variables, and the bottom section includes the class operations.

Figure 9:
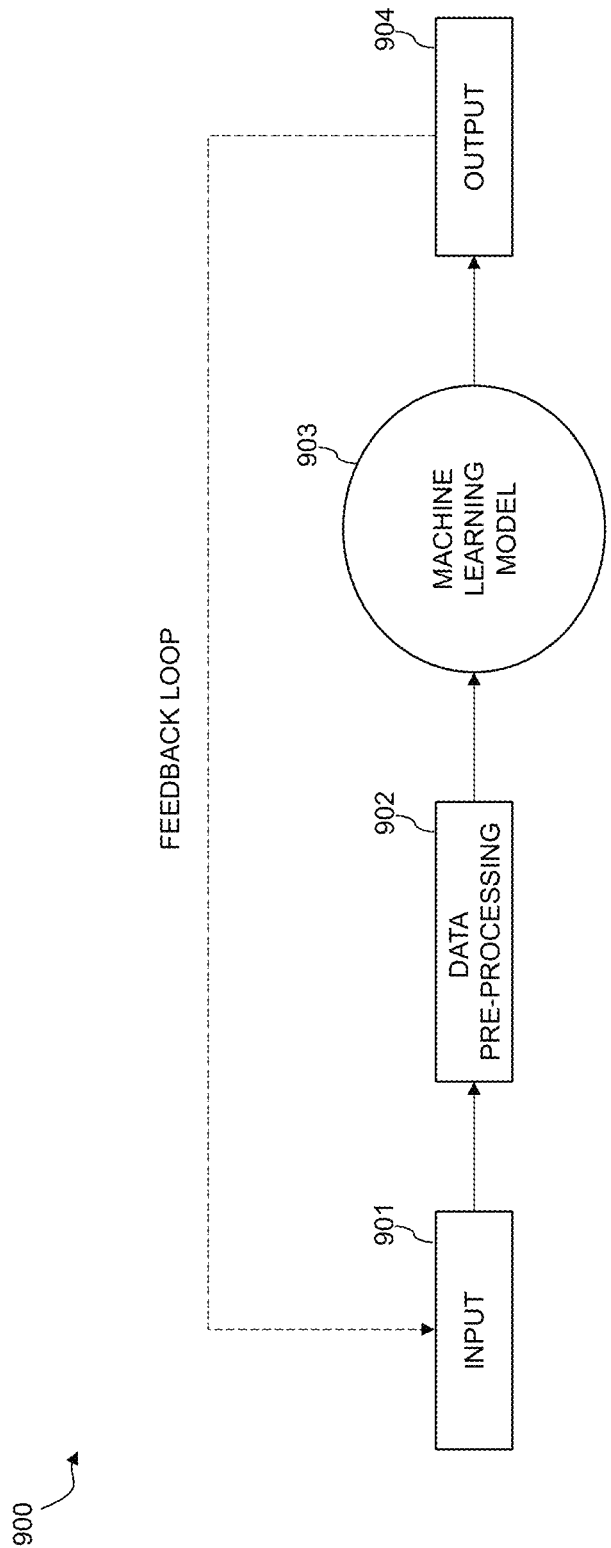
FIG. 9 depicts a block diagram of a software validation time prediction component in an illustrative embodiment.

Referring to the block diagram in FIG. 9, a software validation time prediction component 900 (which is the same as or similar to the time prediction component 174) generates an output 904 comprising an approximate time that will be required to spend on software validation for one or more applications of a particular software release. The output 904 can be utilized by a user when preparing SWAT steps in a launch orchestration program (LOP) process for a particular release. According to an embodiment, the machine learning model used by the prediction component 900 utilizes an ensemble bootstrap aggregation technique. More specifically, the machine learning model 903 uses, for example, a Random Forest regressor algorithm to predict the validation time.

As explained further herein in connection with FIG. 10, the machine learning model is trained on a dataset including a plurality of factors for SWAT time prediction. The model combines several decision trees to produce increased predictive performance than when utilizing a single decision tree. The final validation time prediction for each component (e.g., application) is calculated by computing the average/mean value of the individual predictions from respective ones of the group of decision trees. A feedback loop is incorporated which reinforces the model's training and improves the predictions over time.

The ensemble methods comprise learning algorithms that construct a set of classifiers and classify new data points by taking a weighted vote of the predictions of each classifier. Several base models are combined in order to produce one optimal predictive model. The main principle behind the ensemble model is that a group of weak learners come together to form a strong learner.

According to the embodiments bootstrap aggregating, also called bagging, is performed. The bootstrap aggregating techniques use a machine learning ensemble meta-algorithm designed to improve the stability and accuracy of machine learning algorithms used in statistical classification and regression, reduce variance and further the avoidance of overfitting.

Random Forest is an extension over bagging. The Random Forest regressor algorithm used by the machine learning model 903 includes an ensemble technique which uses a configurable set of homogenous models (e.g., decision trees) to combine the predictions of each model and generate a final prediction. In addition to taking a random subset of data, the Random Forest regressor algorithm also takes a random selection of features rather than using all features to grow decision trees.

In an Operational Example:
1. Suppose there are N observations and M features in a training data set, where N and M are integers. A sample from the training data set is taken randomly with replacement.
2. A subset of M features are selected randomly and whichever feature gives the best split is used to iteratively split a node.
3. The tree is grown to its largest size.
4. The above steps are repeated and a prediction is generated based on the aggregation of predictions from N trees.

The output 904 comprising the predicted duration to perform SWAT validation steps is generated based on an input 901 from, for example, a software validation request including release instructions. The input 901 comprises, for example, the number of applications, the application types and the migration types associated with a particular release. A data pre-processing component 902 processes the data into an appropriate format for input to the machine learning model 903 including the Random Forest regressor. The data pre-processing component 902 cleans any unwanted characters and stop words from the input data. The pre-processing may further include stemming and lemmatization, as well as changing text to lower case, removing punctuation, and removing incorrect or unnecessary characters.

A sample dataset from the input 901 used in the calculation of time for software validation includes, for example, data identifying the release, and as noted above, the number of applications, the application types and the migration types associated with the release. The types of applications may include, but are not necessarily limited to, peer-to-peer (P2P), batch, collection/distribution, and webservice. The types of migrations and corresponding microservices 151 can include, but are not necessarily limited to, batch property, Git property, channel poller creation, PCF service, table creation, Layer 7, Control M job, PCF app, JAR and message queue (MQ) (e.g., RMQ) migration. In more detail, P2P architectures include the partitioning of tasks or workloads between peer nodes, batch refers to batch processing arrangements, and collection/distribution refers to the collection and distribution of data. Git property migration includes version control system property migration. As used herein, a "Git" refers to a distributed version control system to manage code history. PCF includes binding cloud platform services, Layer 7 includes gateway creation, Control M includes workload automation and job scheduling, and MQ corresponds to MOM provider migration.

The machine learning model is trained with a dataset like that shown in the table 1000 of FIG. 10, which includes a plurality of factors for SWAT time prediction. For example, for a plurality of releases 1-10, the number of components (e.g., applications) are listed for each release, as well as the number of different types of applications and migrations associated with a particular release. The table further lists a duration (time) for validation of each release having the specified types and numbers of applications and migrations.

According to one or more embodiments, the input 901 comprises a multi-dimensional feature vector that is input to the machine learning model 903. The multi-dimensional feature vector includes the number of applications, the application types and the migration types. It is to be understood that the noted features are provided by way of example, and that additional features may also be used. Additionally, the number of features used in the prediction analysis and/or training is not limited to what is shown, and there may be more or less features applied to the analysis and ML engine 170 based on validation requests and release instructions. The outputs 904 including the predicted times are stored in the deployment status repository 160.

The feedback loop in FIG. 9 reinforces the training of the machine learning model over time and improves the machine learning model over time. In the feedback loop, the machine learning model is in a continuous dialogue with itself. The output 904 of one stage is treated as training data for another stage. In one or more embodiments, the output 904 is collected and stored by the repository 160 to be used as input 901 to train the machine learning model 903 comprising the Random Forest regressor. The feedback loop permits identification of areas for improvement and assesses the effect of these improvements with the next loop. In other words, the predicted output 904 is used to train new versions of the machine learning model 903. Unlabeled data which has been used for prediction is fed back to the model 903 as training data, which is further analyzed and used in the prediction of future validation times.

Figure 12:
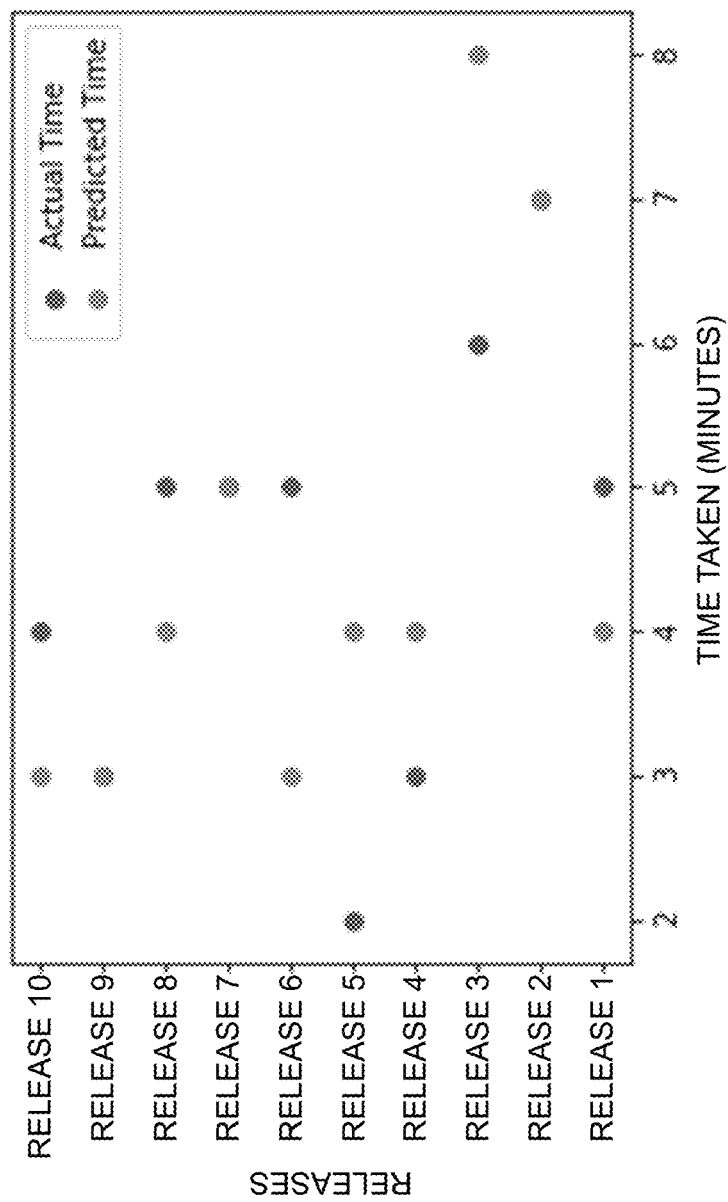
FIG. 12 depicts a graph of random forest regressor accuracy for multiple software releases in an illustrative embodiment.

FIG. 11 includes sample code 1100 to show mean absolute error and accuracy of a trained model, and FIG. 12 depicts a graph 1200 illustrating random forest regressor accuracy for multiple software releases. As shown in FIG. 11, the mean absolute error of a trained random forest regressor model is 1.49, and the accuracy is 98.35%. According to one or more embodiments, if the accuracy percentage of the trained model falls below a given threshold level, the output component 176 recommends one or more remedial actions to users. For example, if the accuracy percentage of predicting the times to complete validation tasks falls below a determined safe-level, the analysis and ML engine 170 recommends remedial action based on LOP processes. The graph 1200 in FIG. 12 illustrates predicted and actual times to complete software validations for a plurality of releases 1-10. In some cases, the predicted times are less than the actual times and in other cases, the predicted times are longer than the actual times. Where there is only one point for a given release, the predicted time is equal to the actual time to complete the validation for a particular release.

Figure 13:
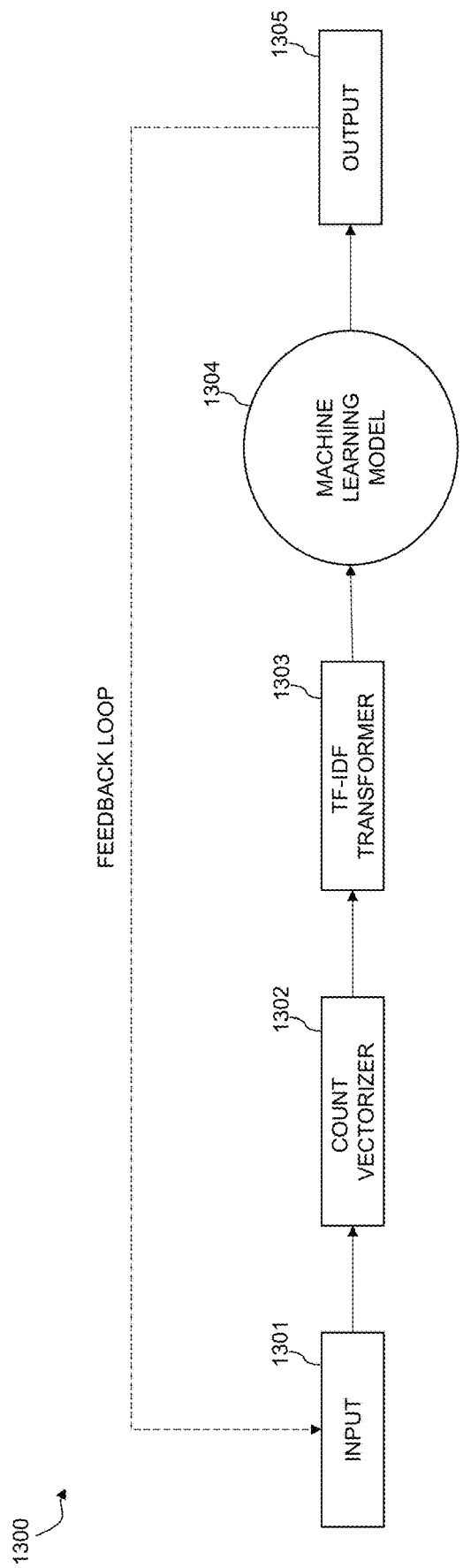
FIG. 13 depicts a block diagram of a root cause prediction component in an illustrative embodiment.

Referring to the block diagram in FIG. 13, a root cause prediction component 1300 (which is the same as or similar to the root cause prediction component 175), comprises a machine learning model which analyzes logs of failed applications in order to predict the root cause for the failure of the applications. In one or more embodiments, this model can be used at the time of PCF application validation if an application fails after deployment. The root cause prediction component 1300 includes a count vectorizer 1302 and a term frequency-inverse document frequency (TF-IDF) transformer 1303 that performs text pre-processing on data in an input 1301 and uses a machine learning model 1304 comprising a Naïve Bayes classifier to classify the logs of the failed application and generate an output 1305 including a prediction of the possible root cause for the application's failure.

Text feature extraction and pre-processing for classification algorithms are used to modify the input 1301. Text and/or documents in the input 1301 may contain words that are redundant for text classification such as, for example, stop words, misspellings, slang words, etc. According to the embodiments, such features are eliminated. More particularly, the failed application logs in the input 1301 are parsed to remove certain words in a process called tokenization. The count vectorizer 1302 encodes the remaining words as integers, or floating-point values, for use as inputs to machine learning algorithms. The count vectorizer 1302 converts a collection of text documents to a matrix of token counts. The TF-IDF transformer 1303 transforms a count matrix to a normalized TF or TF-IDF representation.

TF-IDF is a numerical statistic in NLP that reflects how important a word is to a document in a collection of documents. In general, the TF-IDF algorithm is used to weigh a keyword in any document and assign an importance to that keyword based on the number of times the keyword appears in the document. Each word or term has its respective TF score (how many times a word appears in a document) and IDF score (the inverse document frequency of the word across a set of documents). The product of the TF and IDF scores of a term is referred to as the TF-IDF weight of that term. The higher the TF-IDF weight (also referred to herein as "TF-IDF score"), the rarer and more important the term, and vice versa. Using TF-IDF instead of raw frequencies of occurrence of a token in a given document scales down the impact of tokens that occur very frequently in a given corpus but may be less informative than features that occur in a smaller fraction of the training corpus. It is to be understood that the embodiments are not limited to the use of TF-IDF, and there are alternative methodologies for text vectorization.

After vectorization and transformation, a machine learning model 1304 comprising a Naïve Bayes classifier for multinomial models is used to classify processed text into specific categories. A multinomial Naive Bayes classifier is used to classify with discrete features (e.g., word counts for text classification). The Naive Bayes classifier employs a classification technique based on Bayes' theorem with an assumption of independence between predictors. The Naïve Bayes classifier assumes that the presence of a particular feature in a class is unrelated to the presence of any other feature. Following pre-processing and vectorization, the Naïve Bayes classifier assumes that no remaining words from an error log are dependent, and each word is given the same weight (or importance). None of the attributes are irrelevant and assumed to be contributing equally to the outcome.

Like the feedback loop discussed in connection with FIG. 9, the feedback loop in FIG. 13 reinforces the training of the machine learning model over time and improves the machine learning model over time. The output 1305 of one stage is treated as training data for another stage. In one or more embodiments, the output 1305 is collected and stored by the repository 160 to be used as input 1301 to train the machine learning model 1304 comprising the Naïve Bayes classifier. The feedback loop permits identification of areas for improvement and assesses the effect of these improvements with the next loop. In other words, the predicted output 1305 is used to train new versions of the machine learning model 1304. Unlabeled data which has been used for prediction is fed back to the model 1304 as training data, which is further analyzed and used in the prediction of future root causes. FIG. 14 depicts example pseudocode 1400 for execution of root cause prediction by the root cause prediction component 1300 and generation of a heatmap illustrating accuracy of the root cause prediction component 1300 (or 175). The generated heatmap can be the same or similar to the heatmap 1500 as shown in FIG. 15.

Referring to FIG. 15, a heatmap 1500 illustrates root cause prediction accuracy in connection with a plurality of root cause categories. The vertical axis (y-axis) of the heatmap 1500 corresponds to predicted labels and the horizontal axis (x-axis) corresponds to true labels. The categories listed for the predicted labels are the same as the categories listed for true labels. The predicted labels correspond to those categories identified by the root cause prediction component 1300/175 as the root cause for a given failure, whereas the true labels correspond to those categories that are the actual root cause for a given failure. The numbers at the intersections of the predicted and true labels represent the number of times that a predicted root cause matches with the actual root cause of a failure. For example, PCF service as a predicted root cause of an application failure was correct 9 times, Gemfire as a predicted root cause of an application failure was correct 6 times, Autoscale as a predicted root cause of an application failure was correct 5 times, Buildpack as a predicted root cause of an application failure was correct 1 time. In some other cases, the categories were correct 0, 1, 2, 3 or 5 times.

Although shown as an element of the software validation framework 110 in this embodiment, the analysis and ML engine 170 in other embodiments can be implemented at least in part externally to the software validation framework 110, for example, as a stand-alone server, set of servers or other type of system coupled to the network 104. For example, the analysis and ML engine 170 may be provided as a cloud service accessible by the software validation framework 110.

The analysis and ML engine 170 in the FIG. 1 embodiment is assumed to be implemented using at least one processing device. Each such processing device generally comprises at least one processor and an associated memory, and implements one or more functional modules for controlling certain features of the analysis and ML engine 170.

Although shown as elements of the software validation framework 110, the front-end UI component 120, identity provider 130, API gateway 140, microservices component 150, deployment status repository 160, analysis and ML engine 170 and/or CDN 190 in other embodiments can be implemented at least in part externally to the software validation framework 110, for example, as stand-alone servers, sets of servers or other types of system coupled to the network 104. For example, the front-end UI component 120, identity provider 130, API gateway 140, microservices component 150, deployment status repository 160, analysis and ML engine 170 and/or CDN 190 may be provided as cloud services accessible by the software validation framework 110.

The front-end UI component 120, identity provider 130, API gateway 140, microservices component 150, deployment status repository 160, analysis and ML engine 170 and/or CDN 190 in the FIG. 1 embodiment are each assumed to be implemented using at least one processing device. Each such processing device generally comprises at least one processor and an associated memory, and implements one or more functional modules for controlling certain features of the front-end UI component 120, identity provider 130, API gateway 140, microservices component 150, deployment status repository 160, analysis and ML engine 170 and/or CDN 190.

At least portions of the software validation framework 110 and the components thereof may be implemented at least in part in the form of software that is stored in memory and executed by a processor. The software validation framework 110 and the components thereof comprise further hardware and software required for running the software validation framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the front-end UI component 120, identity provider 130, API gateway 140, microservices component 150, deployment status repository 160, analysis and ML engine 170, CDN 190 and other components of the software validation framework 110 in the present embodiment are shown as part of the software validation framework 110, at least a portion of the front-end UI component 120, identity provider 130, API gateway 140, microservices component 150, deployment status repository 160, analysis and ML engine 170, CDN 190 and other components of the software validation framework 110 in other embodiments may be implemented on one or more other processing platforms that are accessible to the software validation framework 110 over one or more networks. Such components can each be implemented at least in part within another system element or at least in part utilizing one or more stand-alone components coupled to the network 104.

It is assumed that the software validation framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the front-end UI component 120, identity provider 130, API gateway 140, microservices component 150, deployment status repository 160, analysis and ML engine 170, CDN 190 and other components of the software validation framework 110, and the elements thereof can each be implemented in the form of one or more LXCs running on one or more VMs. Other arrangements of one or more processing devices of a processing platform can be used to implement the front-end UI component 120, identity provider 130, API gateway 140, microservices component 150, deployment status repository 160, analysis and ML engine 170 and CDN 190, as well as other components of the software validation framework 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the software validation framework 110 to reside in different data centers. Numerous other distributed implementations of the software validation framework 110 are possible.

Accordingly, one or each of the front-end UI component 120, identity provider 130, API gateway 140, microservices component 150, deployment status repository 160, analysis and ML engine 170, CDN 190 and other components of the software validation framework 110 can each be implemented in a distributed manner so as to comprise a plurality of distributed components implemented on respective ones of a plurality of compute nodes of the software validation framework 110.

It is to be appreciated that these and other features of illustrative embodiments are presented by way of example only, and should not be construed as limiting in any way.

Accordingly, different numbers, types and arrangements of system components such as the front-end UI component 120, identity provider 130, API gateway 140, microservices component 150, deployment status repository 160, analysis and ML engine 170, CDN 190 and other components of the software validation framework 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the software validation framework can be offered to cloud infrastructure customers or other users as part of FaaS, CaaS and/or PaaS offerings.

Figure 16:
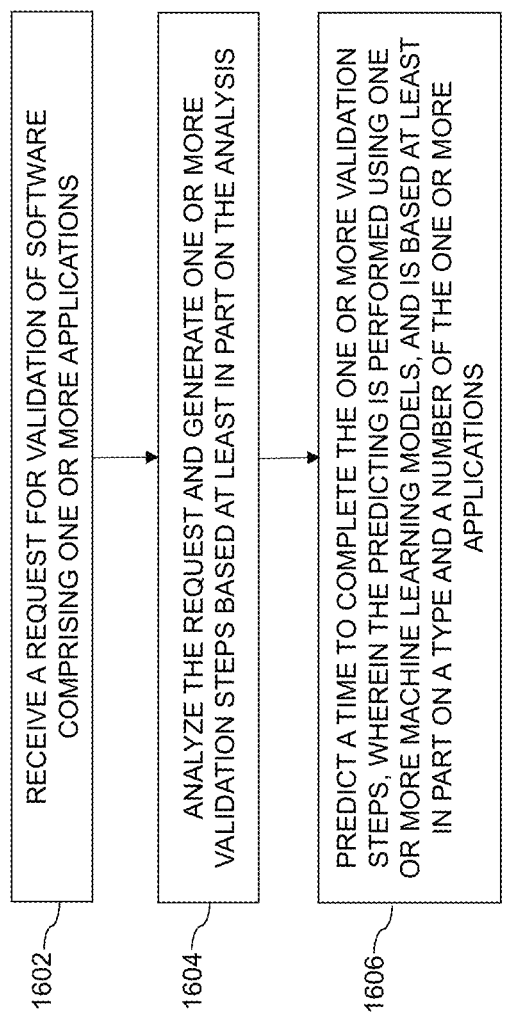
FIG. 16 depicts a process for software validation prediction according to an illustrative embodiment.

The operation of the information processing system 100 will now be described in further detail with reference to the flow diagram of FIG. 16. With reference to FIG. 16, a process 1600 for software validation prediction as shown includes steps 1602 through 1606, and is suitable for use in the system 100 but is more generally applicable to other types of information processing systems comprising a software validation framework configured for making predictions in connection with SWAT.

In step 1602, a request for validation of software comprising one or more applications is received. In step 1604, the request is analyzed and one or more validation steps are generated based at least in part on the analysis. The one or more validation steps are performed by one or more microservices, the microservices comprising, for example, a cloud deployment service, a message queuing service, a change tracking service and a workflow orchestration service. The software validation framework 110 calls the one or more microservices to perform the one or more validation steps. The one or more validation steps may be generated in real-time in response to receiving the request for validation and are based at least in part on software release instructions.

In step 1606, a time to complete the one or more validation steps is predicted, wherein the predicting is performed using one or more machine learning models, and is based at least in part on a type and a number of the one or more applications. The predicting may be further based at least in part on a type of the one or more validation steps. In an embodiment, the one or more machine learning models comprises a Random Forest classifier.

In illustrative embodiments, the one or more machine learning models are trained with data corresponding to times to complete previous software validations and corresponding to types and numbers of applications associated with the previous software validations. Such training data may be stored in and provided to a time prediction component from, for example, a deployment status repository 160.

According to the embodiments, a root cause for failure of the one or more applications during performance of the one or more validation steps is determined using the one or more machine learning models. In an embodiment, the one or more machine learning models comprises a Naïve Bayes classifier. Determining the root cause for failure may comprise analyzing one or more failed application error logs, parsing the one or more failed application error logs using at least one of tokenization and vectorization, and inputting data resulting from at least one of the tokenization and vectorization to the one or more machine learning models.

In illustrative embodiments, the one or more machine learning models are trained with data corresponding to at least one of success and failure of applications in previous software validations. Such training data may be stored in and provided to a root cause prediction component from, for example, a deployment status repository 160. The root cause for failure of the one or more applications may be determined in real-time following the failure of the one or more applications.

It is to be appreciated that the FIG. 16 process and other features and functionality described above can be adapted for use with other types of information systems configured to execute software validation time and root cause prediction services in a software validation framework or other type of platform.

The particular processing operations and other system functionality described in conjunction with the flow diagram of FIG. 16 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 16 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a software validation framework as disclosed herein can provide a number of significant advantages relative to conventional arrangements. For example, one or more embodiments are configured to use machine learning in connection with the prediction of the time that will be taken complete software validation and/or in connection with the predictions of root causes for application failures during SWAT. The embodiments advantageously predict validation time in real-time in response to a software validation request, thus facilitating management of software validation processes. As an additional advantage, NLP and machine learning are used to analyze error logs and predict the root cause in real-time in the case of an application which crashes during deployment and testing.

Unlike current approaches, the embodiments provide an integrated solution that utilizes a microservice architecture which can accommodate multiple heterogeneous independent services. The embodiments further provide a common platform to validate the SWAT steps of all the applications or services deployed during a release, thereby reducing the amount of computing resources needed for software validation and failure troubleshooting.

When using conventional approaches, LOP instructions are silo-based and require SME input, leading to missed scenarios which may affect the business flow. Determining the time needed to complete SWAT steps for a release depends on multiple factors from multiple sources. The embodiments advantageously predict the time needed for validation in real-time using one or more machine learning models to evaluate the multiple factors, so that the validation process can be accurately planned. Moreover, by using the one or more machine learning models, the embodiments streamline error log analysis to determine the root cause for application failures. The embodiments advantageously provide a framework to programmatically create SWAT steps and validate post deployment activities in real-time, thereby resulting in increased efficiency and less error.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the software validation framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a software validation framework in illustrative embodiments. These and other cloud-based systems in illustrative embodiments can include object stores.

Illustrative embodiments of processing platforms will now be described in greater detail with reference to FIGS. 17 and 7. Although described in the context of system 100, these platforms may also be used to implement at least portions of other information processing systems in other embodiments.

Figure 17:
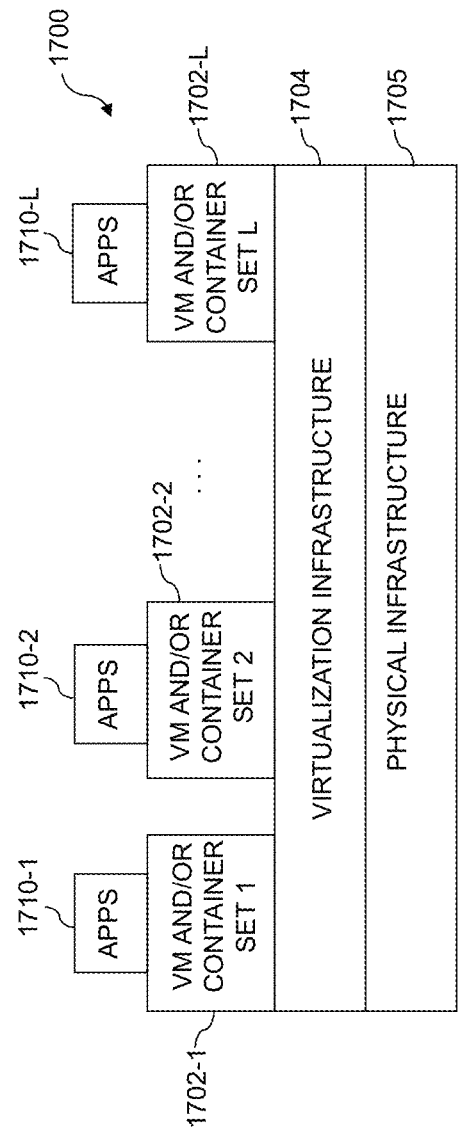
FIGS. 17 and 18 show examples of processing platforms that may be utilized to implement at least a portion of an information processing system according to illustrative embodiments.

FIG. 17 shows an example processing platform comprising cloud infrastructure 1700. The cloud infrastructure 1700 comprises a combination of physical and virtual processing resources that may be utilized to implement at least a portion of the information processing system 100. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

Figure 18:
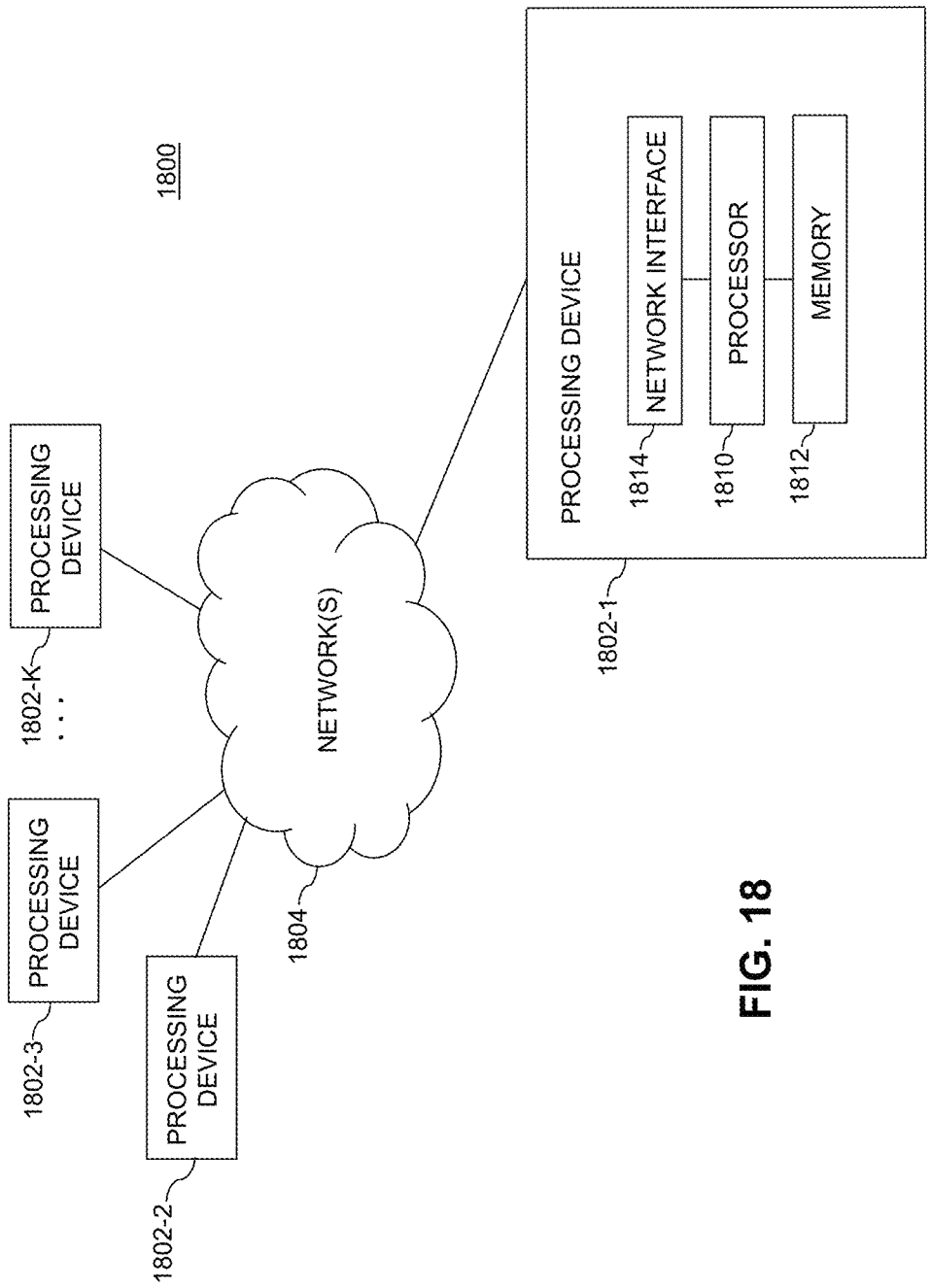

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812. The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the software validation framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and software validation frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    receiving a request for validation of software comprising one or more applications;
    analyzing the request and generating one or more validation steps based at least in part on the analysis; and
    predicting a time to complete the one or more validation steps, wherein:
        the predicting is performed using one or more machine learning models, and is based at least in part on a type and a number of the one or more applications; and
        the predicting comprises inputting a multi-dimensional feature vector comprising at least the type and the number of the one or more applications to the one or more machine learning models;
    wherein the one or more machine learning models are trained with at least a first dataset comprising data corresponding to times to complete previous software validations and corresponding to types and numbers of applications associated with the previous software validations;
    wherein the one or more machine learning models are trained with at least a second dataset generated through a feedback loop and based at least in part on the predicted time to complete the one or more validation steps; and
    wherein the steps of the method are executed by a processing device operatively coupled to a memory.

2. The method of claim 1 wherein the one or more validation steps are performed by one or more microservices.

3. The method of claim 2 wherein the one or more microservices comprise at least one of a cloud deployment service, a message queuing service, a change tracking service, and a workflow orchestration service.

4. The method of claim 2 further comprising calling the one or more microservices to perform the one or more validation steps.

5. The method of claim 1 wherein the predicting is further based at least in part on a type of the one or more validation steps.

6. The method of claim 1 wherein the one or more machine learning models comprise a Random Forest classifier.

7. The method of claim 1 further comprising determining a root cause for failure of the one or more applications during performance of the one or more validation steps, wherein the determining is performed using the one or more machine learning models.

8. The method of claim 7 wherein the one or more machine learning models used in connection with performing the determining comprises a Naive Bayes classifier.

9. The method of claim 7 wherein the determining comprises analyzing one or more failed application error logs.

10. The method of claim 9 wherein the determining further comprises:
    parsing the one or more failed application error logs using at least one of tokenization and vectorization; and
    inputting data resulting from at least one of the tokenization and the vectorization to the one or more machine learning models.

11. The method of claim 7 further comprising training the one or more machine learning models with data corresponding to at least one of success and failure of applications in the previous software validations.

12. The method of claim 7 wherein the root cause for failure of the one or more applications is determined in real-time following the failure of the one or more applications.

13. The method of claim 1 wherein the one or more validation steps are generated in real-time in response to receiving the request for validation of the software and are based at least in part on software release instructions.

14. An apparatus comprising:
    a processing device operatively coupled to a memory and configured to:
        receive a request for validation of software comprising one or more applications;
        analyze the request and generate one or more validation steps based at least in part on the analysis; and
        predict a time to complete the one or more validation steps, wherein:
            the predicting is performed using one or more machine learning models, and is based at least in part on a type and a number of the one or more applications; and
            in performing the predicting, the processing device is further configured to input a multi-dimensional feature vector comprising at least the type and the number of the one or more applications to the one or more machine learning models;
    wherein the one or more machine learning models are trained with at least a first dataset comprising data corresponding to times to complete previous software validations and corresponding to types and numbers of applications associated with the previous software validations; and
    wherein the one or more machine learning models are trained with at least a second dataset generated through a feedback loop and based at least in part on the predicted time to complete the one or more validation steps.

15. The apparatus of claim 14 wherein the processing device is further configured to determine a root cause for failure of the one or more applications during performance of the one or more validation steps, and wherein the determining is performed using the one or more machine learning models.

16. The apparatus of claim 15 wherein, in determining the root cause for failure of the one or more applications, the processing device is further configured to analyze one or more failed application error logs.

17. The apparatus of claim 15 wherein the root cause for failure of the one or more applications is determined in real-time following the failure of the one or more applications.

18. An article of manufacture comprising a non-transitory processor-readable storage medium having stored therein program code of one or more software programs, wherein the program code of the one or more software programs, when executed by at least one processing device, causes the at least one processing device to perform the steps of:
- receiving a request for validation of software comprising one or more applications;
- analyzing the request and generating one or more validation steps based at least in part on the analysis; and
- predicting a time to complete the one or more validation steps, wherein:
  - the predicting is performed using one or more machine learning models, and is based at least in part on a type and a number of the one or more applications; and
  - in performing the predicting, the program code of the one or more software programs further causes the at least one processing device to perform the step of inputting a multi-dimensional feature vector comprising at least the type and the number of the one or more applications to the one or more machine learning models;
- wherein the one or more machine learning models are trained with at least a first dataset comprising data corresponding to times to complete previous software validations and corresponding to types and numbers of applications associated with the previous software validations; and
- wherein the one or more machine learning models are trained with at least a second dataset generated through a feedback loop and based at least in part on the predicted time to complete the one or more validation steps.

19. The article of manufacture of claim 18 wherein the program code of the one or more software programs further causes the at least one processing device to perform the step of determining a root cause for failure of the one or more applications during performance of the one or more validation steps, and wherein the determining is performed using the one or more machine learning models.

20. The article of manufacture of claim 18 wherein the one or more validation steps are performed by one or more microservices.

* * * * *